P. A. PETERSON.
FLEXIBLE GEAR WHEEL.
APPLICATION FILED SEPT. 17, 1918.
1,311,912.
Patented Aug. 5, 1919.
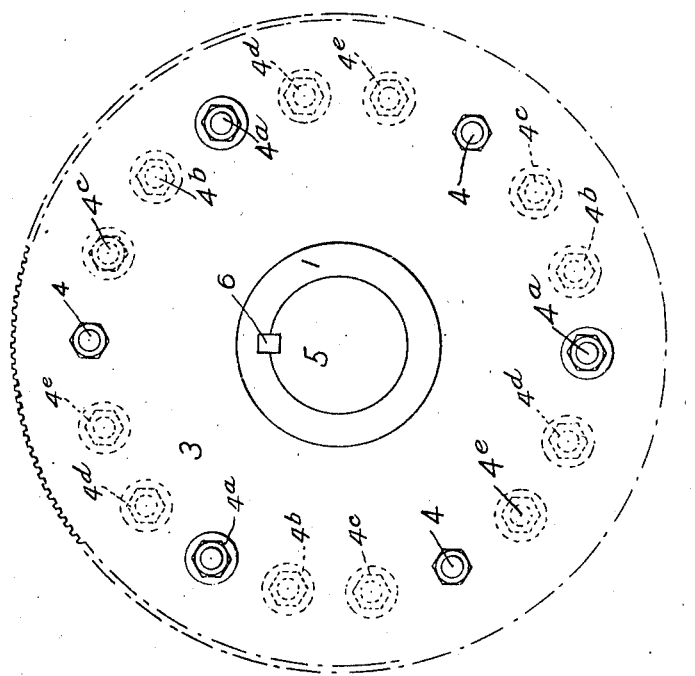
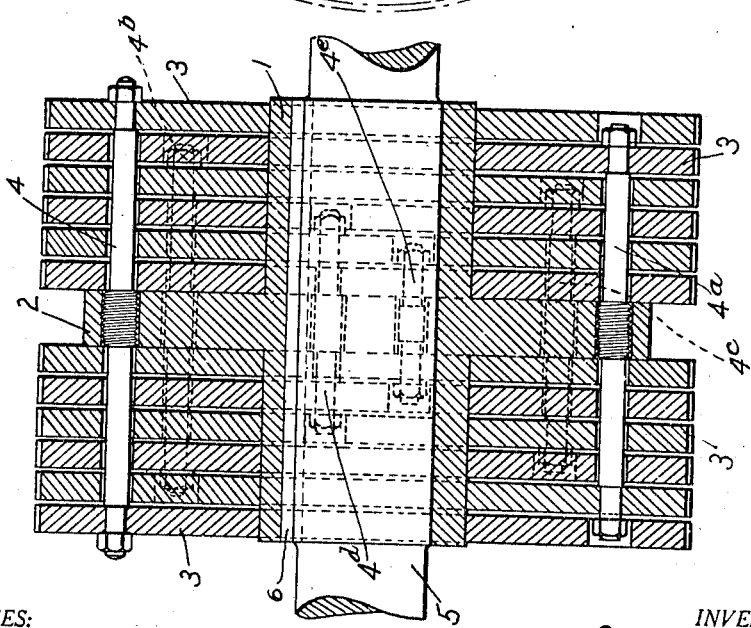
WITNESSES:
INVENTOR.
BY
ATTORNEY

250# UNITED STATES PATENT OFFICE.

PER ARVID PETERSON, OF TRENTON, NEW JERSEY, ASSIGNOR TO DE LAVAL STEAM TURBINE COMPANY, OF TRENTON, NEW JERSEY, A CORPORATION OF NEW JERSEY.

FLEXIBLE GEAR-WHEEL.

1,311,912.   Specification of Letters Patent.   Patented Aug. 5, 1919.

Application filed September 17, 1918. Serial No. 254,400.

*To all whom it may concern:*

Be it known that I, PER ARVID PETERSON, a citizen of the United States of America, and a resident of Trenton, county of Mercer, and State of New Jersey, have invented new and useful Improvements in Flexible Gear-Wheels, of which the following is a specification.

My invention relates to flexible gears or gear wheels; by which term is meant, gear wheels composed of laminæ so held that they may accommodate themselves to imperfections or distortions of another gear, pinion, or rack with which such flexible gear may be in engagement. The gear herein described is particularly intended for use in the transmission of large power and for intermeshing with a small pinion. It has been found that there is difficulty in transmitting large powers between small pinions and large gears, the latter being rigid; under load, the pinion will deflect or distort more in its center than at or near its ends, owing to the existing bending and torsional stresses; and, other things being equal, the smaller the pinion the greater will be the deflection and distortion. The result of the deflection or distortion is heavy bearing on the extreme ends of the teeth. In the case of a spiral gear and pinion, heavy bearing will occur on the pinion at the extreme end of the helix or helices.

According to the present invention these difficulties are overcome and compensated for automatically. The gear is composed of a number of laminæ, held to a central hub by pins or bolts the length of which increases progressively according to the distance of the corresponding laminæ from the said central hub; as a result, in action the laminæ nearest the central hub experience minimum deflection in the direction of rotation, the deflection of other laminæ more distant from the central hub being progressively greater. Proper proportioning of the pins or bolts to the conditions of use will result in practically uniform pressure along the faces of the teeth, notwithstanding considerable distortion of the pinion.

My invention therefore comprises a structure wherein a number of laminæ are each connected to a common and relatively fixed disk or hub, by a flexible pin, in such manner that each lamina may yield individually to pressure; other features of my invention will be pointed out hereinafter. The object of my invention is to improve the construction of flexible gears, such as referred to.

I will now proceed to describe my invention with reference to the accompanying drawing, in which one construction of flexible gear embodying my invention is illustrated, and will then point out the novel features in claims. In said drawing:

Figure 1 shows an axial section of a gear wheel constructed in accordance with my invention, and Fig. 2 shows an end elevation thereof.

In said figures, numeral 1 designates the said central hub or disk, having two sleeve-like portions on opposite sides of its central disk 2, upon which sleeve-like portions are mounted the gear-toothed disks or laminæ 3. In the construction shown, the laminæ on each side of this central disk are equal in number.

From this central disk 2 project pins or bolts 4, $4^a$,—$4^e$, of progressively varying lengths such that each group of such pins, 4, or $4^a$, or $4^b$, etc., serves for one disk or lamina, or one pair of disks or laminæ, only, passing, with considerable clearance, through intermediate laminæ. Thus, the pins marked 4 connect the two outer laminæ to the central disk 2; the pins marked $4^a$ connect those laminæ lying next to the outer laminæ, to the central disk 2; and so on. Each pin, other than the shortest pins, $4^e$, passes through intermediate laminæ with such clearance as permits its flexure to the required extent. The pins are provided on their ends with suitable screw nuts, whereby the disks or laminæ which they serve are secured to them, and so to the central hub and disk 1—2.

5 designates a shaft upon which the hub 1 is mounted, and 6 a key by which the hub is secured to said shaft. It will be apparent that in the event of transmission of power from or to shaft 5, through the laminated gear, and through a pinion in mesh with that gear, the laminæ of the gear may yield as may be necessary to compensate for bending or other distortion of the pinion; such yielding being effected by slight backward rotation of the several laminæ, individually, with accompanying flexure of the corresponding pins 4, 4ª,—4ᵉ.

What I claim is:

1. A flexible gear comprising a plurality of laminæ, a support, and flexible pins connecting such laminæ individually to said support and adapted by flexure to permit individual yielding of the laminæ, the pins for outer laminæ passing with clearance through apertures in the lamina or laminæ intermediate such outer laminæ and the support.

2. A flexible gear comprising a plurality of laminæ, a support comprising a hub upon which said laminæ are mounted, and a disk forming a part of said hub and separating said laminæ into a plurality of groups, and flexible pins projecting laterally from said disk and each connecting one or more said laminæ individually to said disk and adapted by flexure to permit individual yielding of the laminæ, the pins for outer laminæ passing with clearance through apertures in the lamina or laminæ intermediate such outer laminæ and the support.

In testimony whereof I have signed this specification in the presence of two subscribing witnesses.

PER ARVID PETERSON.

Witnesses:
C. R. WALLER,
C. J. ALBERT.